United States Patent [19]

Cors, deceased et al.

[11] 4,266,342
[45] May 12, 1981

[54] SUPPORTING ASSEMBLY FOR AN ALIGNMENT LINE

[76] Inventors: Bernard E. Cors, deceased, late of Aurora, Ill.; Bette M. Cors, executrix, 403 W. Galena Blvd., P.O. Box 1406, Aurora, Ill. 60506

[21] Appl. No.: 902,119

[22] Filed: May 2, 1978

[51] Int. Cl.³ .............................................. G01B 5/00
[52] U.S. Cl. .................................. 33/1 Q; 33/1 LE; 33/339; 33/413; 248/214
[58] Field of Search ............... 33/1 Q, 1 LE, 86, 339, 33/144, 146, 137, 138, 85, 84, 403, 404, 410, 413; 248/214

[56] References Cited

U.S. PATENT DOCUMENTS

| 603,157 | 4/1898 | Spitzenberg ......................... 33/86 |
| 1,591,485 | 7/1926 | Guillet . |
| 1,872,860 | 8/1932 | Winter ................................... 33/85 |
| 1,907,959 | 5/1933 | Guillet . |
| 2,395,393 | 2/1946 | Brilliantine . |
| 2,708,557 | 5/1955 | Clark ............................. 248/214 X |
| 2,836,897 | 6/1958 | Gooley . |
| 3,151,372 | 10/1964 | Miles ................................. 33/86 X |
| 3,181,248 | 5/1965 | Manlove ......................... 33/203 X |

FOREIGN PATENT DOCUMENTS 997633 9/1951 France ...................................... 33/1 Q
855835 12/1960 United Kingdom ...................... 33/86

*Primary Examiner*—William D. Martin, Jr.
*Attorney, Agent, or Firm*—Stevens, Davis, Miller & Mosher

[57] ABSTRACT

An alignment line supporting assembly is provided with releasable locking means for attachment to a rail of a railway track. Each assembly includes a pair of spaced reference line support devices having respective line support arms positioned outside the track to which are coupled respective ends of a tautly drawn string or wire. Two pairs of support assemblies are preferably provided on respective rails to establish reference lines on either side of the railway track. Measurements are made between a vehicle adapted to ride the rails and the reference line at various positions to ensure the correct alignment of the vehicle for railway operation.

7 Claims, 8 Drawing Figures

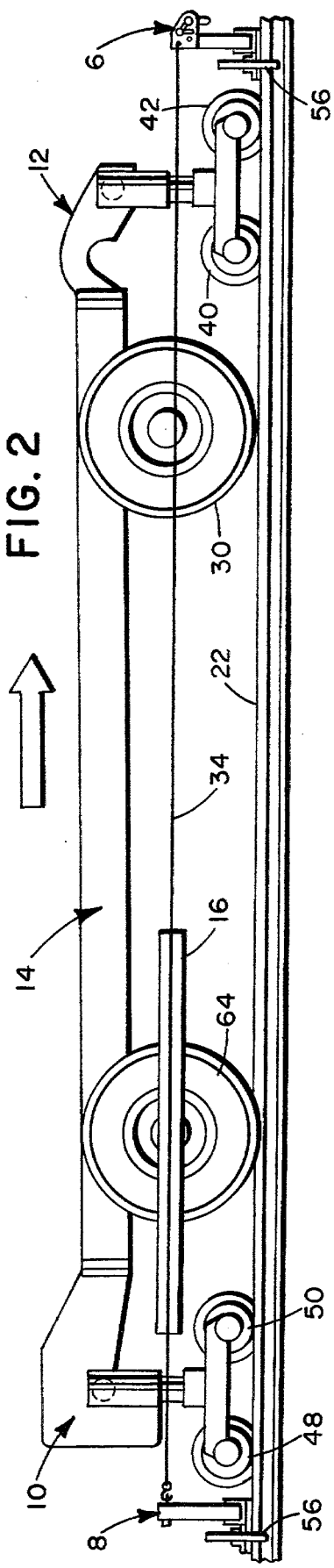
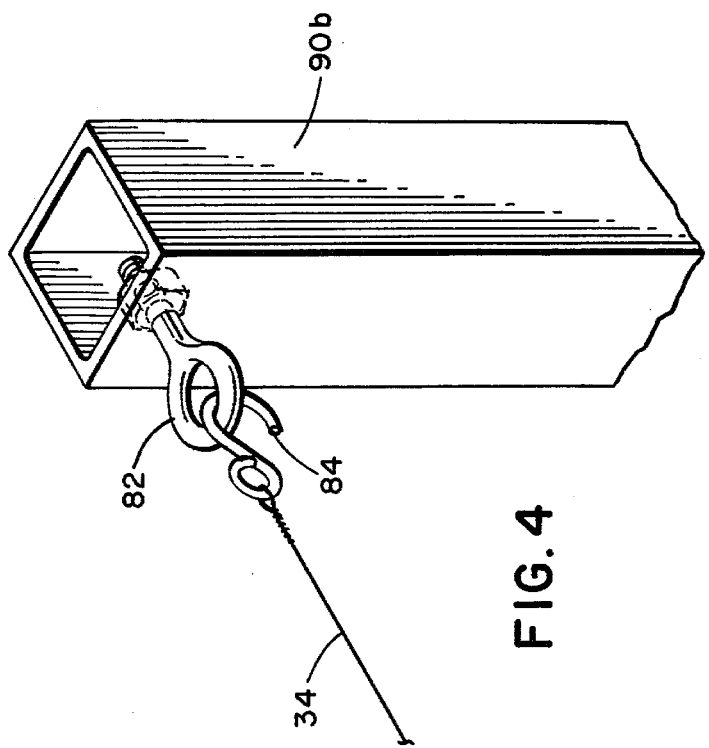
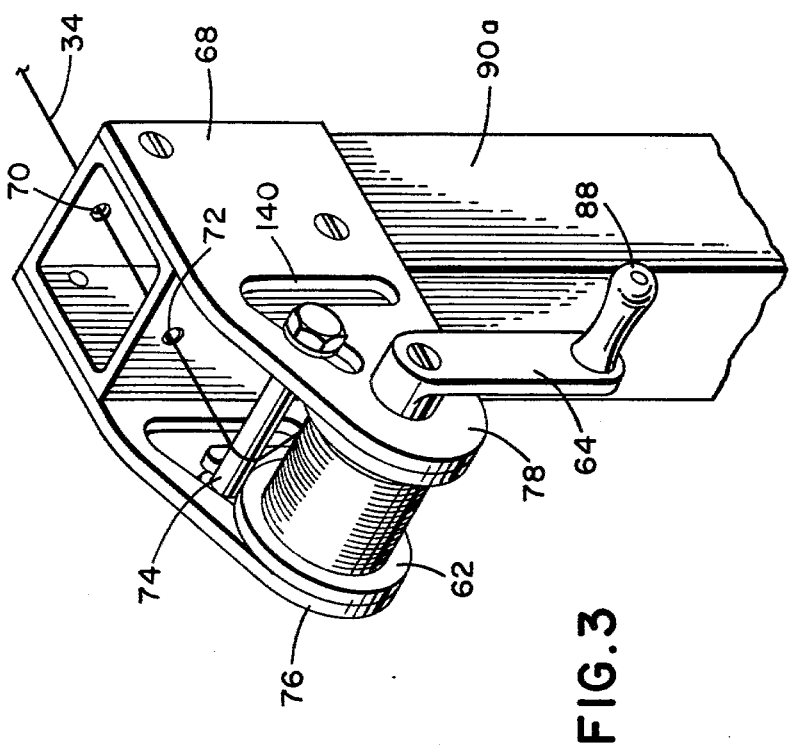
FIG. 2
FIG. 4
FIG. 3

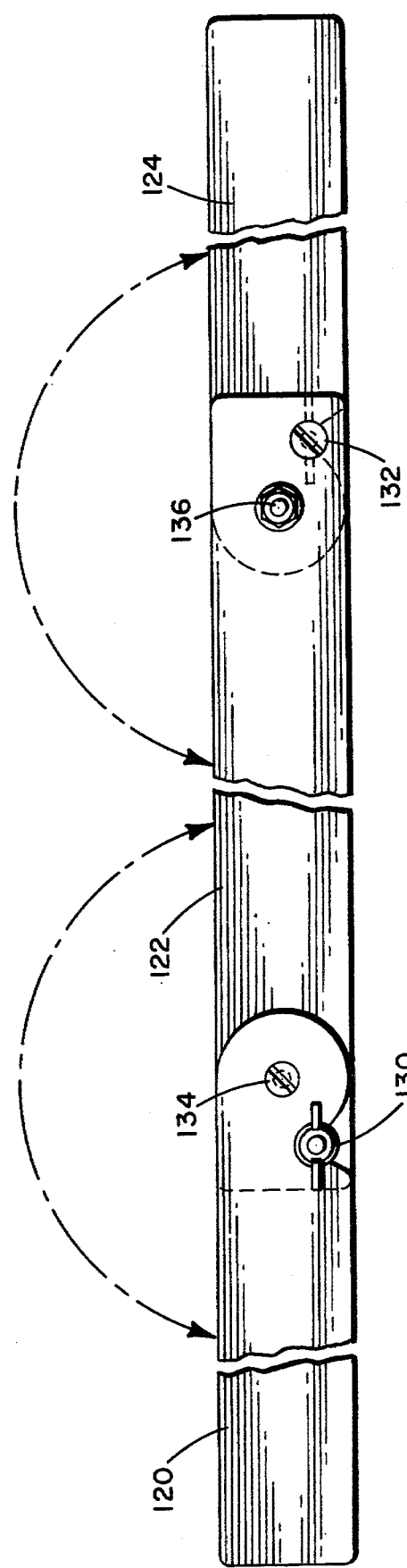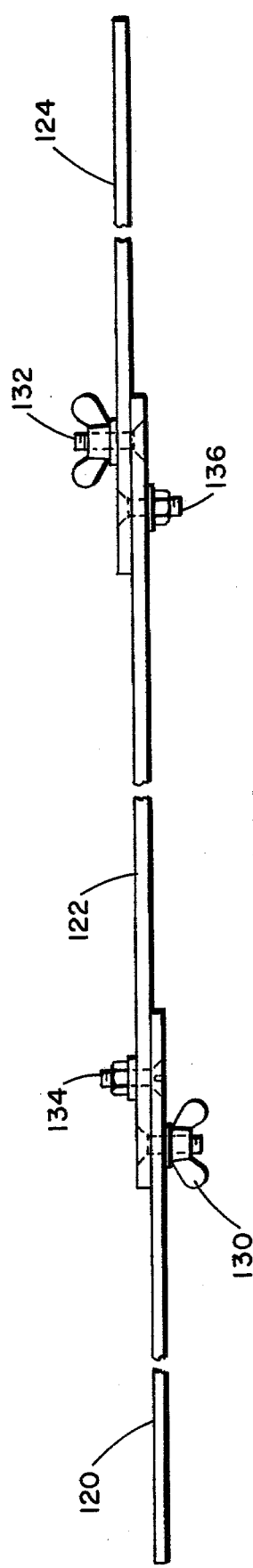

SUPPORTING ASSEMBLY FOR AN ALIGNMENT LINE

BRIEF SUMMARY OF THE INVENTION

A known method of properly aligning vehicles adapted to ride the rails of a railway track uses a reference string or wire traversing either side of a railway vehicle and suitably spaced from the track. Once the reference line is established, measurements are taken from the reference lines to the vehicle at various locations to ensure that the vehicle is properly centered and that its wheels are properly aligned for rail use.

Structures used for this purpose have included a pair of beams disposed traversly to a railway track at the front and back of a vehicle. The ends of each beam terminate in upwardly projecting line support arms which are spaced outwardly from the track by a suitable distance. The support arms of the front and back beams located on the same side of the track are interconnected by strings or wires to form the parallel reference lines disposed on either side of the vehicle.

Several problems occur with the use of these beams and attached support arms. Since the beams are relatively long they are heavy and cumbersome to transport. In addition, since they are simply laid over the tracks in a transverse direction thereto, they can be accidently moved during measurements necessitating the repositioning of the beams and retaking of all measurements. Also the stretching of the string or wire between the beams which is necessary in order that a desired tatuness by achieved, can result in slight movements in the non-anchored beams resulting in either erroneous measurements or the need to reposition the beams and resume measurements once the beams are repositioned. If the beams are somehow locked in position on the rails then the positioning and repositioning of the beams both before and during measurement becomes cumbersome and awkward.

In order to overcome these and other problems, one object of the present invention is to provide a reference line support assembly which is relatively small, light weight, and easily locking attached and detached with the rails of a railway track by a first locking mechanism.

Another object of the invention is to provide a reference line support assembly in which an adjustment of the reference line end points in the direction transversed to the rails can be easily and readily accomplished, thus facilitating the positioning of the reference line and points once the line support assembly is locked to the rails.

Another object of the invention is to provide reference line supply and tightening mechanism which facilitates the tensioning of the reference line prior to the taking of measurements.

These and other objects of the invention are achieved by providing at least one and, preferably two string by support assemblies, one for each side of the track, each containing a pair of support devices having respective reference line support arms which are adapted to be positioned outside the track on the same side thereof, preferably at positions in front of and behind a vehicle whose alignment is to be checked. The support devices are individually coupled to an appropriate rail by a releasable locking mechanism and are adjustable such that the respective support arms can be equidistantly spaced outward from the vehicle, such that a wire stretched between the support arms is parallel to the vehicle. A tautly drawn string or wire is connected between the support arms to form the reference line from which alignment measurements will be taken.

The support devices are each locked to the rails by means of an adjustable vise clamp which facilitates their attachment and detachment with the rails. One of the support arms for each pair of support assemblies includes an attachment means such as a ring to which the reference line is fixed, while the other support arm includes a supply and tensioning mechanism for the reference line.

Once all support devices are fixed in position and parallel reference lines established on either side of a vehicle, alignment measurements can be taken between the reference lines and the vehicle to ensure that the vehicle wheels are accurately centered, aligned and will tram on the tracks before the vehicle is allowed to operate thereon.

These and other objects and features of the invention will become more evident from the following detailed discussion of the invention which is read in conjunction with the accompanying drawings.

BRIEF DESCRIPTION OF THE DRAWINGS

FIG. 2 illustrates in side view the structures illustrated in FIG. 1.

FIG. 3 illustrates a detailed construction of a support arm containing a reference line supply and tensioning device.

FIG. 4 illustrates a support arm containing a ring to which a reference line can be coupled.

FIGS. 7 and 8 illustrate respectively a front elevational and top plan view of a folding straightedge measurement aid.

DETAILED DESCRIPTION OF THE INVENTION

Figure 1:
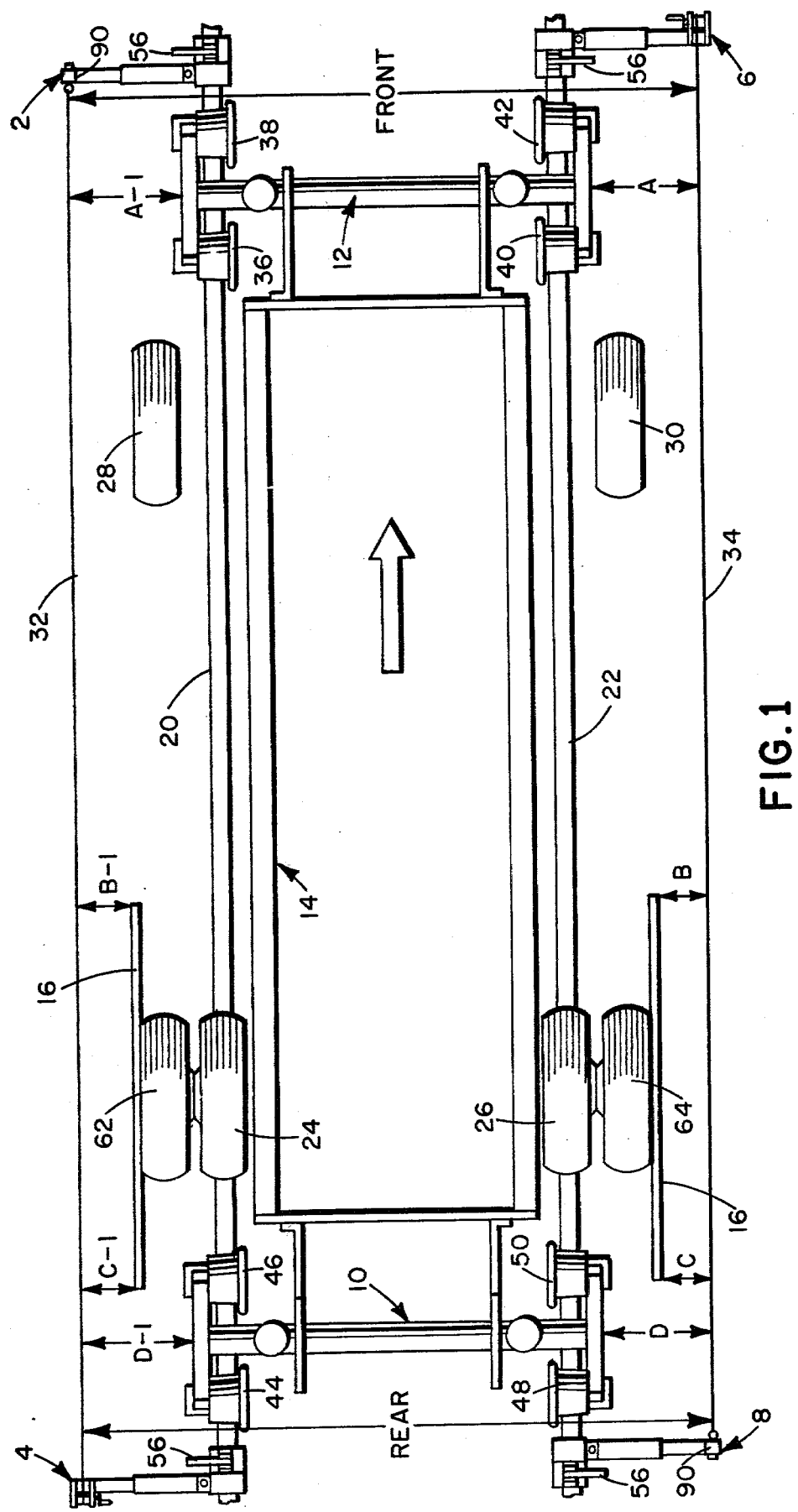
FIG. 1 illustrates in top view the attachment of a pair of locking assemblies and respective reference lines on each of the rails of a railway track.

FIG. 1 shows the general environment in which the present invention is particularly useful. A vehicle, indicated generally by numeral 14 which is normally adapted for use on a roadway, is illustrated as adapted for use on a railway track containing rails 20 and 22. Front tires 28 and 30 of the vehicle are adapted to ride outside of the rails and be lifted off of the ground. Rear tires 24 and 26, however, are adapted to ride directly on the rails to provide the motive power for driving the vehicle. In order to enable the vehicle to ride along the rails 20 and 22 without falling off, railway wheel support assemblies 10 and 12 are provided respectively at the rear and front of the vehicle. Railway wheel support assemblies 10, 12 are hydraulically operated by a control mechanism (not shown) to raise and lower the railway wheels 36, 38, 40, 42 provided at the front of the vehicle and wheels 44, 46, 48 and 50 provided at the rear of the vehicle. As further illustrated in FIG. 2, front wheel support assembly 12 is adapted to lift the front wheels of the vehicle off the ground while rear railway wheel support assembly 10 is adapted to allow the rear wheels of the vehicle to ride on the rails to provide motive power for the vehicle.

Before vehicle 14 can be driven along rails 20 and 22, it must be accurately aligned with respect thereto. Otherwise, damage and/or derailment may occur. In order to provide a reference point from which accurate vehicle alignment measurements may be made, reference lines 32 and 34 are provided. These reference lines may take the form of a string or a wire stretched taut between support arms 90 (FIG. 5) of the respective support devices 2 and 4 and 6 and 8 and are disposed, as illustrated, on opposite sides of the railway track parallel thereto.

Figure 5:
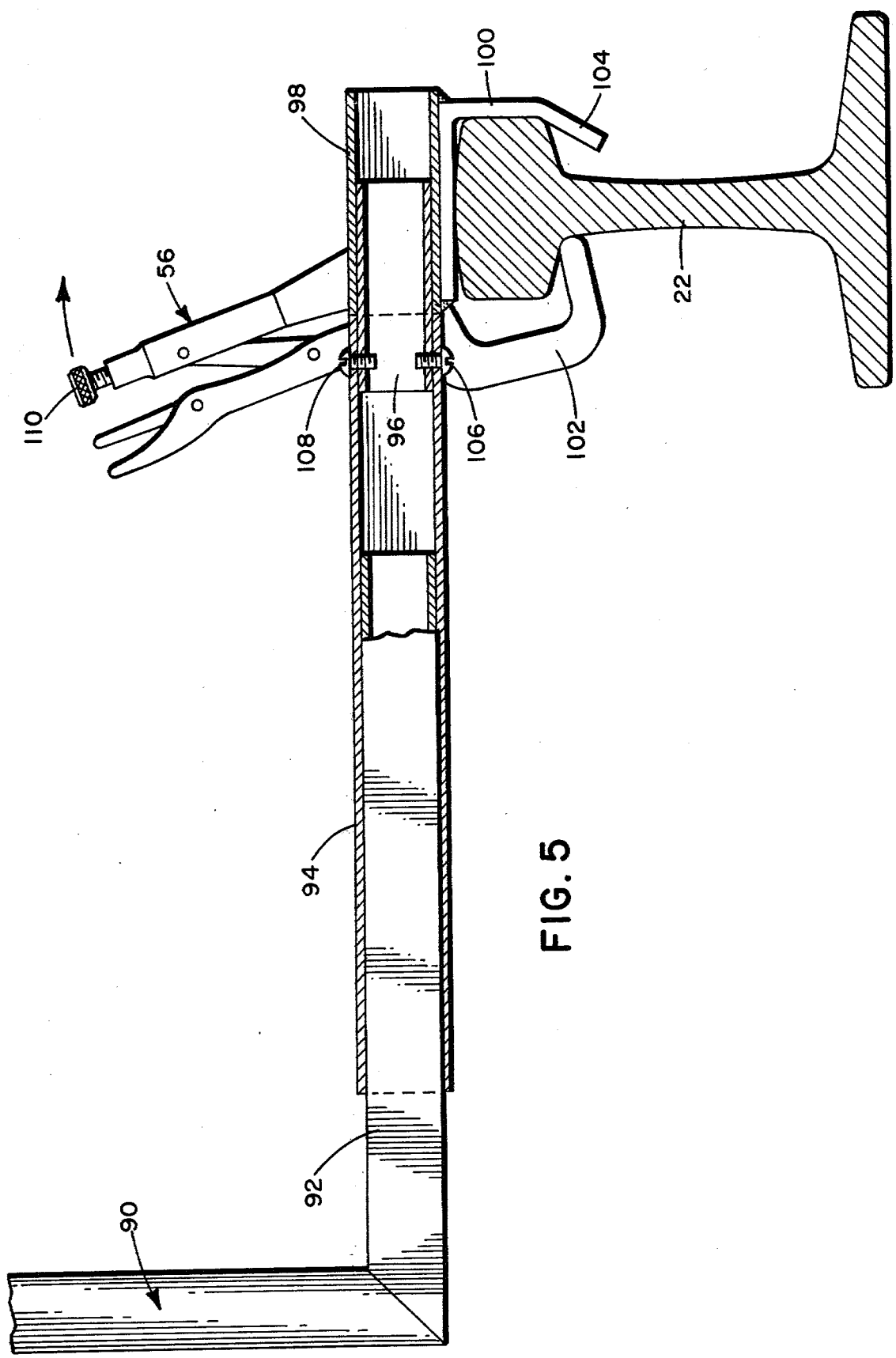
FIG. 5 illustrates in side view the adjustment mechanism for a support arm and the coupling of the support device to a rail.
Figure 6:
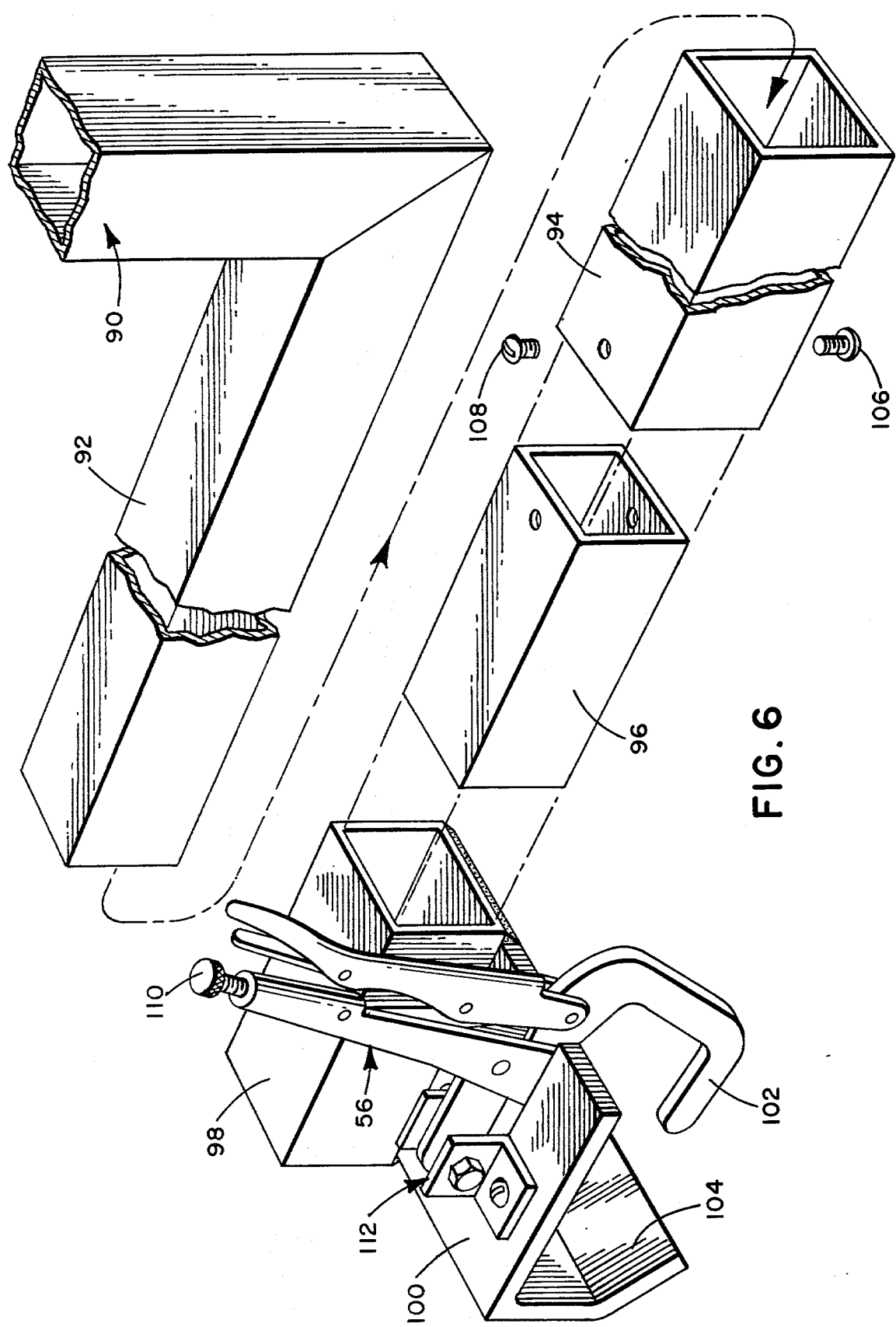
FIG. 6 illustrates a perspective view of a support device including the coupling mechanism for attaching it to a rail.

Before alignment measurements can be taken, each of the support devices 2, 4, 6, and 8 is coupled to an appropriate rail by means of an adjustable vise clamp 56 as illustrated in FIGS. 5 and 6. Thereafter, a respective support arm 90 is horizontally extended a desired amount. Each support arm is extended by the same amount so that parallel reference lines may be established.

Once parallel reference lines 32 and 34 are established on either side of the vehicle, measurements may be taken between them and various portions of the vehicle to ensure its centering and alignment on rails 20 and 22. Representative measurements which can be taken are illustrated in FIG. 1, as A, B, C, D, A-1, B-1, C-1, and D-1. If the relationships A=A-1, B=B-1, C=C-1, D=D-1, C-1=B-1, and B+C=B-1+C-1 are present, the vehicle is properly aligned. To facilitate the measurements of B, C, B-1 and C-1, a straightedge 16 may be respectively applied to the rear wheels 62, 64 of the vehicle. The straightedge is necessary to determine if the wheels are in tram. Improper tram can indicate wheel or axle misalignment. Of course, additional measurements may be taken along the length of the vehicle at various positions in lieu of or in addition to those described above.

The specifics of the reference line support devices will now be discussed with particular reference to FIGS. 3 thru 6.

One of the support arms for each pair of support assemblies has mounted thereon a supply take-up spool, while the other includes a ring to which the reference line is attached. FIGS. 3 and 4 illustrate these structures in greater detail. FIG. 3 shows a take-up and supply spool 62 for reference line 34. This spool is mounted in a frame 68 which includes parallel spool support arms 76 and 78. The spool 62 is further coupled to arm 64 and handle 88 for rotative movement. A locking pin 74 is also provided in parallel support plates 76 and 78 for locking the spool at a particular position. Locking occurs when pin 74 is moved from the position illustrated in FIG. 3 and dropped in slot 140 thereby putting pressure on outer edges of the spool. As illustrated, frame 68 is disposed on the top of support arm 90a and is attached thereto with screws. Holes 70 and 72 are provided in support arm 90a to allow the passage therethrough of reference line 34. The other end of reference line 34 is attached to a hook 84 which is adapted to engage with the ring end of an eyebolt 82 located in support arm 90b of another support device.

Although each of the support devices may alternatively contain either the supply spool or eyebolt on its support arm, all support devices have a common base assembly and clamping support mechanism which is illustrated in FIGS. 5 and 6. In these figures reference line support arm 90 is coupled to a support arm base 92 which slides in an exterior casing 94 forming part of the base assembly of the support device. Horizontal adjustments can be effected by sliding element 92 within casing 94 to a selected position. Support device base 94 is further coupled via screws 106 and 108 to a slidable interior tubular element 96 which allows a further relative movement between support arm 90 and the fixed rail 22.

The support arm exterior casing base assembly and associated elements 92, 94, 96 and 98 are all coupled to the rail via a clamping frame 100 connected to sleeve 98. Clamping frame 100 engages with the top and one side of the upper portion of a rail 22 and contains a bent projection 104 positioned beneath the upper portion of the rail. Clamping frame 100 cooperates with an adjustable vise clamp 56 to lockingly secure a support device to the rail.

Vise clamp 56 includes a projection 102 which mates with the other side of the upper portion of the rail and is oppositely disposed from projection 104. Adjustments in the required clamping force and degree of clamping tension can be effected in a well known manner by adjustable portion 110 of vise clamp 56. The vise clamp is coupled to frame 100 by means of a pivotable support, generally indicated as element 112 in FIG. 6.

Although not specifically illustrated in the drawings, further sleeve and outer casing arrangements similar to that shown between elements 92 and 94 in FIGS. 5 and 6 can be provided on the vertically extending support arm 90 to allow for relative adjustments in the height of reference line 34.

FIGS. 7 and 8 show a foldable straightedge which may be used for straightedge 16 (FIGS. 1 and 2). It preferably includes three flat bar sections 120, 122 and 124 with the outer two sections 120 and 124 foldable about respective bolts 134 and 136 relative to middle section 122. In use, the straightedge is unfolded and placed on a rail, one edge up and the other down and the wing nuts 126, 128 tightened on respective bolts 130, 132 to hold the sections 120, 122 and 124 in a straight line. For convenience of use, the extended length is calibrated to be 53½ inches long, the dimension specified by manufacturers for the distances between inner faces of opposite rail wheels. When folded, the straightedge is 19¼ inches long.

Although applicant's unique support assembly for a reference line has been shown and described with particular reference to a specific embodiment thereof, it should be apparent that many changes in form and detail may be made without departing from the spirit and scope of the present invention. For example, although two reference lines and associated support assemblies have been specifically described, a single assembly and associated reference line may be used, as noted. All such modifications are intended to be covered within the scope of the invention which is limited solely by the appended claims.

What is claimed is:

1. An apparatus for use in providing a point of reference for aligning vehicles with respect to a railway track comprising:

a first reference line support device for engaging with the top of a first rail of said track, said first support device including a first reference line support arm, a first coupling arm having a first end connected with said first reference line support arm and a second end connected to a first clamping mechanism for attaching said first support device to the top of said first rail;

a second reference line support device for engaging with the top of said first rail, said second support device including a second reference line support arm, a second coupling arm having a first end connected with said second reference line support arm and a second end connected to a second clamping mechanism for attaching said second support device to the top of said first rail;

a first reference line for interconnecting said first and second support arms;

a first reference line attachment device attached to said first support arm;

a reference line supply spool attached to said second support arm to which one end of said first reference line is coupled, said first reference line being further provided at its other end with a second reference line attachment device for engaging with said first attachment device;

a handle coupled to said supply spool for imparting rotative movement thereto and a locking mechanism for locking said supply spool to prevent its rotation;

said first and second clamping mechanism each comprising a stationary frame for engaging with the top and a side of said first rail and a pivotal adjustable releasable lockable vise clamp mechanism for engaging with another side of said first rail; and, said first and second coupling arms being adjustable and allowing relative movement between respective said first and second support arms and said first rail, each said first and second coupling arms comprising a first tubular outer sleeve coupled to a respective said stationary frame for engagement with said first rail and a first tubular inner sleeve connected to a respective said support arm and adapted for slidable movement in said first tubular outer sleeve.

2. An apparatus as in claim 1 comprising:

a third reference line support device for engaging with the top of a second rail of said track, said third support device including a third reference line support arm, a third coupling arm having a first end connected with said third reference line support arm and a second end connected to a third clamping mechanism for attaching said third support device to the top of said second rail;

a fourth reference line support device for engaging with the top of said second rail of said track, said fourth supporting device including a fourth reference line support arm, a fourth coupling arm having a first end connected with said fourth reference line support arm and a second end connected to a fourth clamping mechanism for attaching said fourth support device to the top of said second rail;

a second reference line for interconnecting said third and fourth support arms;

a third reference line attachment device attached to said third support arm, a second reference line supply spool attached to said fourth support arm to which one end of said second reference line is respectively coupled, said second reference line being further provided at its other end with a fourth reference line attachment device for respectively engaging with said third attachment device;

a second handle coupled to said second supply spool for imparting rotative movement thereto and a second locking mechanism for respectively locking said second supply spool to prevent its rotation;

said third and fourth clamping mechanisms each comprising a stationary frame for engaging with the top and a side of said second rail and a pivotal adjustable releasable lockable vise clamp mechanism for engaging with another side of said second rail; and said third and fourth coupling arms being adjustable and allowing relative movement between said third and fourth support arms and said second rail, each said third and fourth coupling arms comprising a second tubular outer sleeve coupled to a respective said stationary frame for engagement with said second rail and a second tubular inner sleeve coupled to a respective said support arm and adapted for slidable movement in said second tubular outer sleeve.

3. An apparatus as in claim 2 wherein said first and second attachment devices are rings and said third and fourth attachment devices are hooks.

4. An apparatus as in claim 2 wherein said first, second, third, and fourth support arms are substantially vertically oriented.

5. An apparatus as in claim 1 wherein said first attachment device is a ring and said second attachment device is a hook.

6. An apparatus as in claim 1 wherein said first and second support arms are substantially vertically oriented.

7. An apparatus for supporting a reference line for aligning vehicles with respect to a railway track comprising:

a vertical reference line support arm, a first horizontal inner tubular member attached to said first support arm, a first outer tubular member having a first end portion in which said first inner tubular member reciprocally slides, a second inner tubular member having a portion thereof fixed within a second end portion of said first outer tubular member, a second outer tubular member in which a portion of said second inner tubular member reciprocally slides, a rail attachment element fixed to said second outer tubular member, said rail attachment element having a first portion for engaging with the top surface of said rail and extending therefrom a bent second portion for engaging with one side of an upper portion of said rail and projecting beneath an upper portion of said rail, and an adjustable quick-release vise clamp pivotally connected to said rail attachment element and having a projecting portion for engaging with the other side of the upper portion of said rail.

* * * * *